United States Patent

[11] 3,572,010

| [72] | Inventor | John A. Dupps, Sr.<br>Germantown, Ohio |
|---|---|---|
| [21] | Appl. No. | 847,269 |
| [22] | Filed | Aug. 4, 1969 |
| [45] | Patented | Mar. 23, 1971 |
| [73] | Assignee | Duke, Inc.<br>Germantown, Ohio |

[54] VAPOR CONTROL APPARATUS
10 Claims, 1 Drawing Fig.

[52] U.S. Cl. ..................................... 55/222,
261/161, 261/16, 165/118, 165/111
[51] Int. Cl. ..................................... B01f 3/04

[50] Field of Search ......................................... 261/(Condensers Digest), 161, 16; 55/222; 165/111, 118

[56] References Cited
UNITED STATES PATENTS

| 980,108 | 12/1910 | Lillie .......................... | 261/161 |
| 1,632,572 | 6/1927 | Willcox ....................... | 261/161 |

*Primary Examiner* — Tim R. Miles
*Attorney* — Melville, Strasser, Foster & Hoffman ABSTRACT: Vapor control apparatus embodying in a single unit the combined functions of a shell and tube condenser, a condensing water cooling tower, and an air scrubber.

PATENTED MAR 23 1971
3,572,010
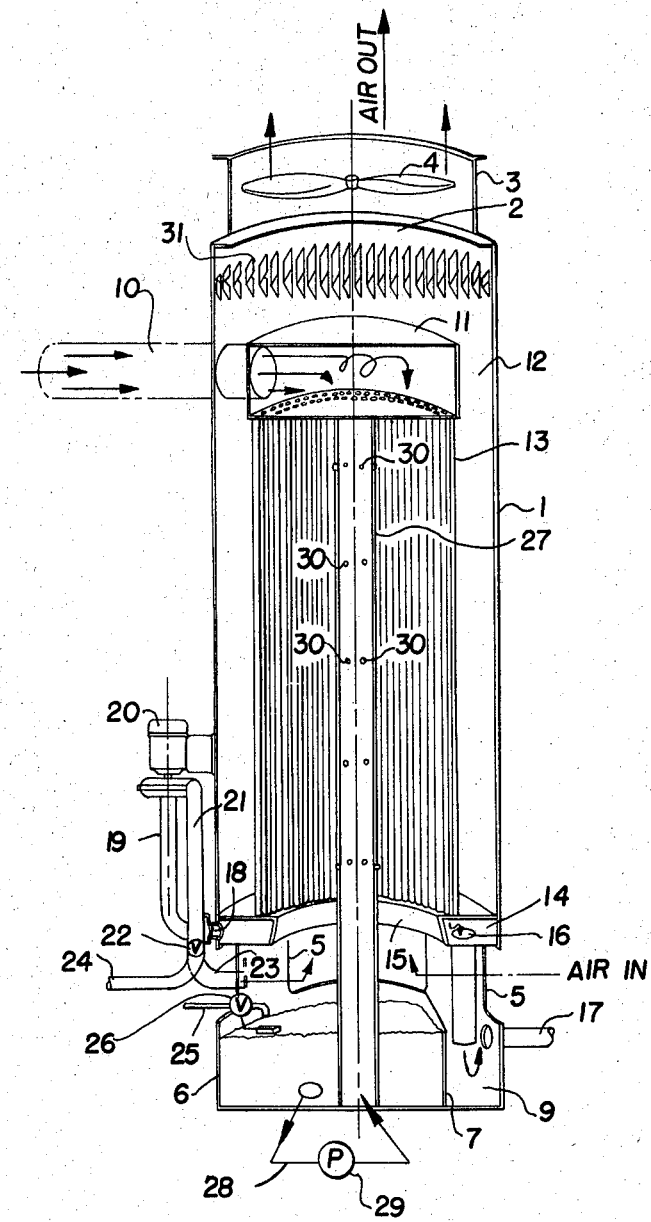
INVENTOR/S
John A. Dupps, Sr.
BY *Melville, Strasser, Foster and Hoffman*
ATTORNEYS

VAPOR CONTROL APPARATUS

BACKGROUND OF THE INVENTION

The present invention relates to pollution control apparatus and more particularly to apparatus for disposing of noxious and odoriferous vapors generated as an incident to various processing operations. For example, in the rendering of animal, fish and poultry by-products, such as fat, bone, and offal to yield fat and pressed tankage, the raw materials are cooked to breakdown the cells and release the fats, as well as materially reduce the moisture content of the materials being cooked. Such systems obviously generate highly odoriferous vapors which, if simply exhausted into the atmosphere, are highly objectionable and hence must be controlled. While it has hitherto been proposed to condense such vapors and dispose of both the condensate as well as the remaining noncondensables, either by incineration or by a separately performed scrubbing operation which washes and dilutes the remaining gases to eliminate objectionable odors prior to their release into the atmosphere, separate pieces of equipment was required for each operation.

In contrast to the procedures heretofore employed wherein each of the operations was performed utilizing separate pieces of equipment, the instant invention contemplates a unitary vapor controller which condenses the generated vapors, washes the remaining noncondensables to remove objectionable odors, and additionally serves to evacuate air from the building in which the apparatus is located, thereby controlling interior odors which are inevitable in a rendering plant.

While the invention will be described in conjunction with the control of vapors generated in a rendering plant, it will be understood that the utility of the invention is not so limited and that the apparatus may be utilized in diverse installations wherein noxious and odoriferous vapors are encountered.

RESUME OF THE INVENTION

The vapors and the noncondensables generated in the cooking vessel or other generating source are drawn into the top of the vapor control apparatus by means of a blower. The vapors enter into a fully closed tubular condensing section and pass downwardly through a series of annularly arranged condensing tubes wherein condensing is accomplished by cooling the tubes with a water spray. The condensed vapors are accumulated in a chamber at the bottom of the condensing section and are piped away to a sewer. The chamber is also provided with an outlet pipe which vents the noncondensables through a blower and back into the center of the condensing section for passage through a water spray.

The bottom of the vapor controller comprises a water reservoir where an initial charge of water is placed. This water is continuously pumped up a center pipe which is equipped with spray nozzles to spray the water onto the condensing tubes, the water returning to the reservoir by running down the tubes. Some of the circulating water is continuously discharged to the sewer along with the condensed vapors. This discharge is utilized to prevent excessive buildup of salts in the circulating water and also serve to further cool the condensate before it is discharged to the sewer. Since some water is continuously lost to the atmosphere by evaporation from the condensing tubes and some by discharge to the sewer, a controlled amount of makeup water is continuously and automatically added to the reservoir through a float control valve.

A large propeller-type fan is located on top of the vapor controller which continuously draws air upwardly through the apparatus. This air enters through openings in the bottom of the vapor controller and passes upwardly through the water sprays and across the tubes and through a demisting section before being discharged to the atmosphere. It is into this airstream that the noncondensables are introduced at the bottom of the apparatus, the gaseous noncondensables being carried upwardly by the airstream where they are washed by the sprays and highly diluted by admixture with the air before being discharged into the atmosphere. The air supply itself is obtained from the interior of the building and also contains objectionable odors which are removed as it is scrubbed. The washing to remove particulate matter along with the high dilution will provide sufficient treatment to eliminate objectionable odors before the admixed plant air and noncondensable gases are discharged to the atmosphere. Additionally, the passage of the air through the water spray serves to cool the water before it comes into contact with the condensing tubes and consequently removes the heat from the system to the atmosphere. Alternatively, where incineration of the noncondensables is mandatory, instead of being introduced into the stream of plant air, they may be diverted to an incinerator.

DESCRIPTION OF THE DRAWING

The single FIG. is a pictorial vertical sectional view of vapor control apparatus in accordance with the invention.

DESCRIPTION OF THE PREFERRED EMBODIMENT

As seen in the drawing, the apparatus comprises an elongated, vertically disposed, preferably cylindrical housing 1 having an open top 2 surrounded by an extension or exhaust stack 3 adapted to project upwardly through the roof of the building in which the vapor control apparatus is located so as to vent the exhausted air to the outside atmosphere. A propeller-type fan 4 is preferably located within the exhaust stack 3 so as to draw the air upwardly through the housing 1, the air entering the housing through large inlet ports 5 in the annular base 6, the lowermost portion of which is divided by a baffle 7 into a water reservoir 8 and a condensate discharge compartment 9.

The vapors and noncondensables from the cooking vessel or other generating source are introduced into the apparatus through the conduit 10 which extends inwardly through the housing with its innermost end opening into a closed upper chamber 11 which is preferably of annular configuration and of a diameter sufficiently smaller than the diameter of the housing 1 so as to provide an essentially annular passageway 12 for the air which is drawn upwardly through the housing 1 by the fan 4. An annular bank of condensing tubes 13 project downwardly from the upper chamber 11, the uppermost ends of the condensing tubes opening into the under surface of the chamber 11. At their lowermost ends, the condensing tubes 13 open into a closed lower chamber 14 which is in the form of an annular ring extending inwardly from the wall surfaces of the housing 1 at its lowermost end and terminating inwardly in an annular wall 15 lying to the inside of the condensing tubes and defining an airflow passageway though which the air drawn into the apparatus through the ports 5 flows upwardly through the housing.

The lower chamber 14 has a drain outlet 16 in its under surface positioned to discharge condensate into the compartment 9 for discharge though conduit 17 which may be conveniently connected to a sewer. A second outlet 18 is arranged to withdraw the noncondensables through an outlet outlet end 19 by means of blower 20 which delivers the noncondensables through conduit 21 to valve 22 by means of which the noncombustibles may be either returned to the system through branch conduit 23 or delivered to an incinerator through branch conduit 24. The valve 22 also may be utilized to control the rate of flow of the noncondensables back into the system or, alternatively, a regulating gate may be provided at the outlet of branch conduit 23.

Water may be introduced into the reservoir through inlet pipe 25 and float controlled valve 26 which, once the reservoir has been filled, serves to automatically add makeup water to the reservoir when the apparatus is in use. During operation, some of the returning water which runs down the condensing tubes will spill into the discharge compartment 9 and is discharged to the sewer along with the condensate. This for water is used to prevent excessive buildup of salts in the circulating water and also serves to further cool the condensate prior to its discharge into the sewer. If desired, the height of the baffle 7 may be adjusted to permit water from the reservoir to cascade into the compartment 9, or the baffle may be perforated to permit the controlled flow of additional water into the discharge compartment.

The water in the reservoir is continuously pumped upwardly through the center pipe 27 by means of conduit 28 and pump 29, the center pipe being equipped at spaced intervals along its length with radially disposed sets of spray nozzles 30 arranged to direct conical sprays of water outwardly from the center pipe onto the annular array of condensing tubes, the sprayed water also passing beyond the condensing tubes out to the wall surfaces of the housing 1. The water returns to the reservoir by gravity, running down the tubes and the walls of the housing and into the reservoir through the opening defined by the annular wall 15 of the lower condensate chamber 14.

In the operation of the device, the water sprayed from the nozzles 13 will cool the condensing tubes and hence condense the vapors flowing through the tubes, the condensate so formed being collected in the lower condensing chamber 14 where such condensate is discharged to sewer through drain outlet 16 and drain conduit 17. At the same time, the noncondensable materials are withdrawn from the lower chamber through conduit 19 and either delivered through branch conduit 24 to a suitable incinerator in which the gases are burned, or the noncombustibles are introduced into the annular base 6 and hence are admixed with the plant air being drawn into the system through the inlet ports 5. The noncondensables are thus highly diluted and, as the airstream is drawn upwardly through the housing, the airstream is washed so as to remove particulate matter. In this connection, it will be noted that as the air flows upwardly through the housing 1, it will flow outwardly between the annular array of condensing tubes and around the upper chamber 11 through the annular passageway 12. The passage of the air through the water sprays assists in cooling the water and acts to remove heat from the system and discharge it into the atmosphere.

It is also preferred to provide means for demisting the moisture laden air; and it has been found that a series of inclined baffles 31 mounted above the upper chamber 11 in closely spaced apart relation so that the exiting air must impinge on the surfaces of the baffles before being discharged, adequately serves to remove the water vapor which condenses on the baffles and hence drains by gravity downwardly through the housing and into the reservoir for recirculation.

As should now be evident, the vapor control apparatus combines in a unitary structure the functions of a shell and tube condenser, a condensing water cooling tower, and a plant air scrubber, together with the optional incineration of the noncondensables or their washing and discharged into the outside atmosphere along with the plant air. Modifications may, of course, be made in the invention without departing from its spirit and purpose. Several modifications have already been set forth and others will undoubtedly occur to the skilled worker in the axially upon reading this specification. For example, while the inlet ports for the plant air are shown as being of fixed size, it will be evident that the ports could incorporate regulating gates by means of which their size can be altered, thereby controlling the flow of air through the system.

The embodiments of the invention in which an exclusive property or privilege is claimed are defined as follows:

I claim:

1. In vapor control apparatus:
   an elongated vertically disposed tubular housing, spaced apart upper and lower closed annular chambers within said housing, said upper chamber being spaced inwardly from the wall surfaces of said tubular housing so as to define an essentially annular passage therebetween, said lower chamber extending inwardly from the wall surfaces of said housing and terminating inwardly in an annular wall surface defining a centrally disposed air inlet;
   an annular array of condensing tubes interconnecting said upper and lower chambers, said condensing tubes surrounding the centrally disposed air inlet defined by said lower chamber, means for introducing odor containing vapor into said upper chamber;
   means for discharging condensate from said lower chamber, including means for also discharging noncondensables from said lower chamber; of
   water spray means mounted within said housing and positioned to spray water on said annular array of condensing tubes throughout substantially their full length; and
   blower means for drawing air (FIGS. said housing through said centrally disposed air inlet and for discharging it from the opposite end of the said housing, the air stream so formed flowing upwardly through and around said condensing tubes and through the sprays of water emitted by said water spray means.

2. The vapor control apparatus claimed in claim 1 wherein the means for discharging noncondensables from said lower chamber includes means for introducing the noncondensables into the airstream flowing upwardly through said housing.

3. The vapor control apparatus claimed in claim 2 wherein said water spray means comprises a centrally disposed water pipe extending upwardly within said annular array of condensing tubes, said pipe having radially disposed sets of nozzles arranged to direct sprays of water outwardly toward said condensing tubes.

4. The vapor control apparatus claimed in claim 3 wherein a water reservoir underlies said lower annular chamber, and pump means operatively connected to said centrally disposed water pipe for pumping water from said reservoir into said pipe.

5. The vapor control apparatus claimed in claim 4 including conduit means for introducing water into said reservoir, and means for regulating the back and forth of water into said reservoir.

6. The vapor control apparatus claimed in claim 5 wherein the means for discharging condensate from said lower chamber includes a discharge compartment for receiving condensate from said lower chamber, and means for introducing water into said discharge compartment.

7. The vapor control apparatus claimed in claim 6 wherein said discharge compartment is open to the flow of a part at least of the spray water returning to said reservoir through the centrally disposed opening in said lower chamber.

8. The vapor control apparatus claimed in claim 7 including baffle means in said housing overlying said upper chamber and positioned so that the air stream flowing upwardly through said housing impinges on said baffles prior to being discharged from said housing.

9. The vapor control apparatus claimed in claim 1 wherein the means for discharging noncombustibles from said lower chamber includes means for selectively introducing the noncombustibles into the airstream flowing upwardly through said housing, or for diverting said noncondensables to an incinerator or the like.

10. In vapor control apparatus:
   an elongated vertically disposed tubular housing, spaced apart upper and lower closed annular chambers within said housing, said upper chamber being spaced inwardly from the wall surfaces of said housing so as to define an essentially annular passageway therebetween, said lower chamber extending inwardly from the wall surfaces of said housing and terminating inwardly in an annular wall surface defining a centrally disposed passageway opening downwardly from said housing;
   an annular array of condensing tubes interconnecting said upper and lower chambers, said condensing tubes surrounding the centrally disposed opening in said lower chamber;
   conduit means for introducing vapors into said upper chamber;
   an annular base underlying said housing, said base having a plurality of air inlet ports therein, the lower portion of said base being divided by a baffle into a water reservoir and a condensate discharge compartment;

a centrally disposed water pipe extending upwardly from said reservoir through said annular array of condensing tubes, sets of radially disposed spray nozzles mounted at spaced apart intervals along said water pipe within the area of said condensing tubes, pump means for pumping water from said reservoir into said water pipe, and conduit means for introducing water into said reservoir, including float-controlled valve means for maintaining a predetermined water level in said reservoir;

means for discharging condensate from said lower chamber into said discharge compartment;

means for discharging noncondensables from said lower chamber, said discharge means comprising conduit means for selectively introducing the noncondensables into said annular base above said reservoir, or for directing said noncondensables to an incinerator or the like;

blower means at the upper end of said housing beyond said upper chamber for drawing air upwardly through the central opening in the lower chamber, so as to initially lie to the inside of said annular array of condensing tubes, the air stream stream flowing outwardly around said condensing tubes and upwardly around said upper chamber; and baffle means in said housing between said blower means and said upper chamber, said baffle means being inclined and positioned so that the air stream will impinge on the inclined surfaces of said baffles.